United States Patent [19]

Habert

[11] 4,086,895
[45] May 2, 1978

[54] IGNITION SYSTEM FOR INTERNAL COMBUSTION ENGINES

[76] Inventor: Roger Habert, 6, rue du Faisan Doré, 94370 Sucy en Brie, France

[21] Appl. No.: 527,689

[22] Filed: Nov. 27, 1974

[30] Foreign Application Priority Data

Nov. 29, 1973 France .................. 73 42543
Jul. 9, 1974 France .................. 74 23808

[51] Int. Cl.² .......................................... F02P 5/04
[52] U.S. Cl. .......................... 123/148 E; 123/117 R; 123/117 D
[58] Field of Search ........ 123/148 E, 117 R, 146 TA, 123/148 MCD

[56] References Cited

U.S. PATENT DOCUMENTS

| | | | |
|---|---|---|---|
| 3,314,407 | 4/1967 | Schneider | 123/148 E |
| 3,357,114 | 12/1967 | Green | 123/148 E |
| 3,521,611 | 7/1970 | Finch | 123/117 R |
| 3,592,178 | 7/1971 | Schiff | 123/148 E |
| 3,660,689 | 5/1972 | Oishi et al. | 123/148 E |
| 3,738,339 | 6/1973 | Huntzinger et al. | 123/148 E |
| 3,738,340 | 6/1973 | Olson | 123/148 E |
| 3,741,176 | 6/1973 | Schmidt et al. | 123/148 E |
| 3,752,139 | 8/1973 | Asplund | 123/117 D |
| 3,756,212 | 9/1973 | Schirmer et al. | 123/148 E |
| 3,757,755 | 9/1973 | Carner | 123/117 D |
| 3,811,420 | 5/1974 | Vogel | 123/146.5 A |
| 3,853,103 | 12/1974 | Wahl et al. | 123/117 R |
| 3,854,465 | 12/1974 | Adams | 123/148 E |
| 3,867,916 | 2/1975 | Bigalke | 123/148 E |
| 3,871,342 | 3/1975 | Fujinami et al. | 123/146.5 A |
| 3,874,349 | 4/1975 | Fitzner | 123/148 E |
| 3,923,022 | 12/1975 | Scholl | 123/146.5 A |

Primary Examiner—Ronald B. Cox

[57] ABSTRACT

An ignition system for an internal combustion engine, in which system a position detector cooperates with an element driven in proportion to engine speed and supplies signals after shaping thereof, to a tachometric generator, the generator feeding an integrator which supplies a first voltage representative of the angular spacing from a reference position of said element, an amplifier in series with the integrator and supplying a second voltage as a function of engine speed, and a comparator receiving the sum of the first and second voltages and comparing it with a threshold voltage such that when said sum coincides with the threshold voltage, the comparator supplies an output signal used to trigger current in the ignition coil.

9 Claims, 14 Drawing Figures

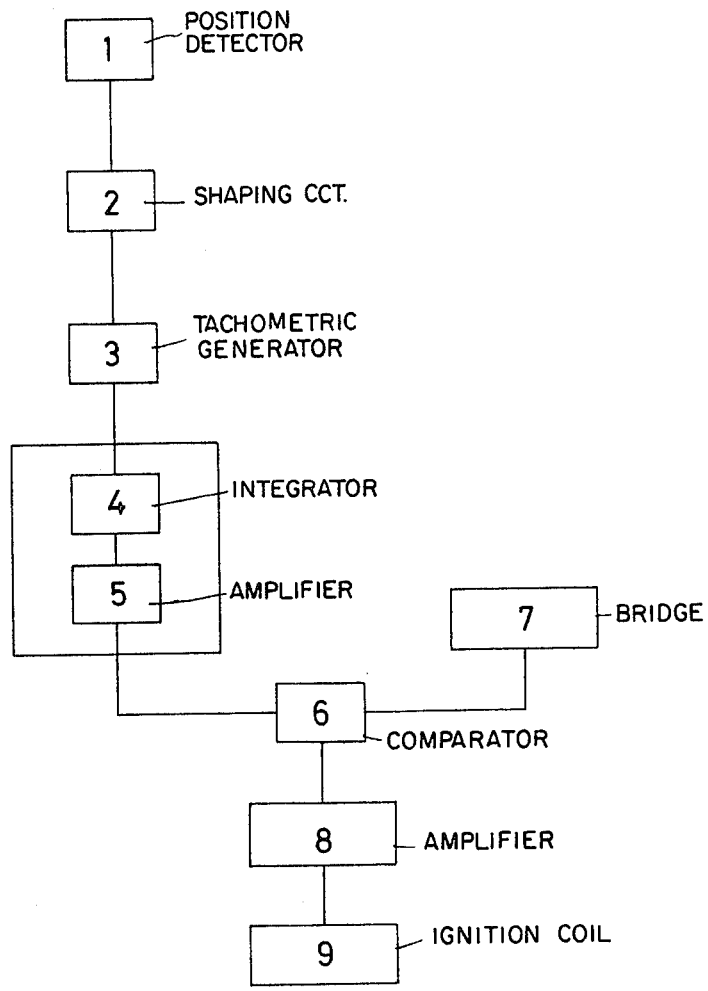
_FIG.1_

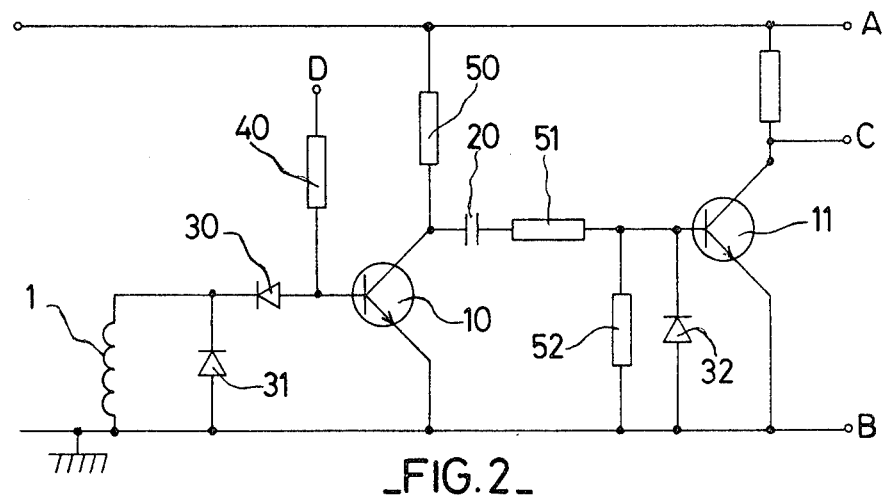
_FIG.2_
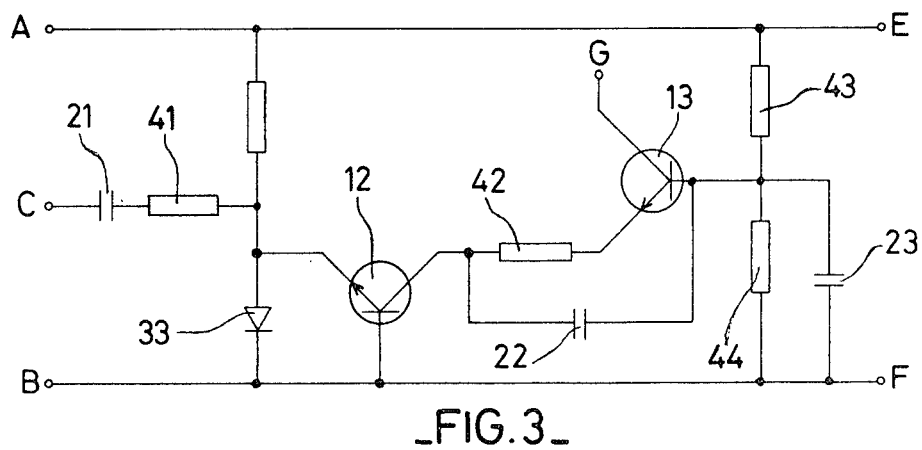
_FIG.3_
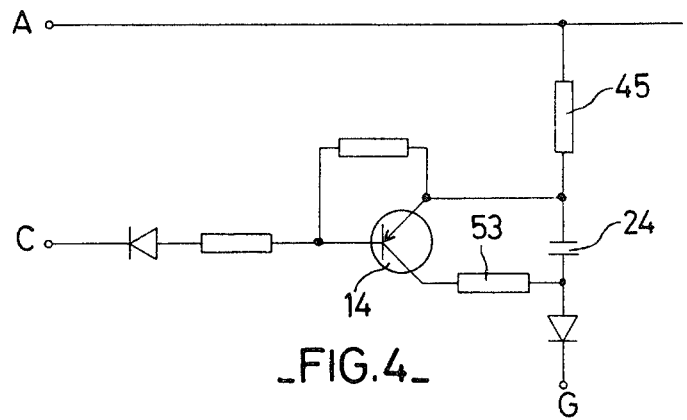
_FIG.4_

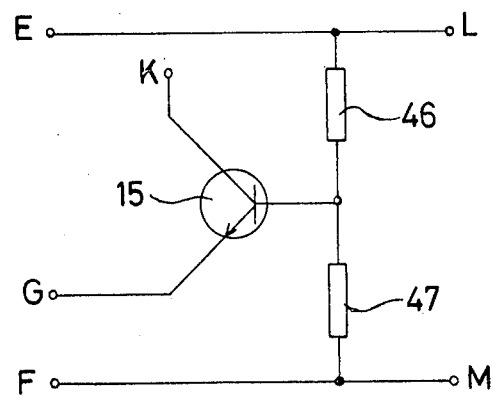
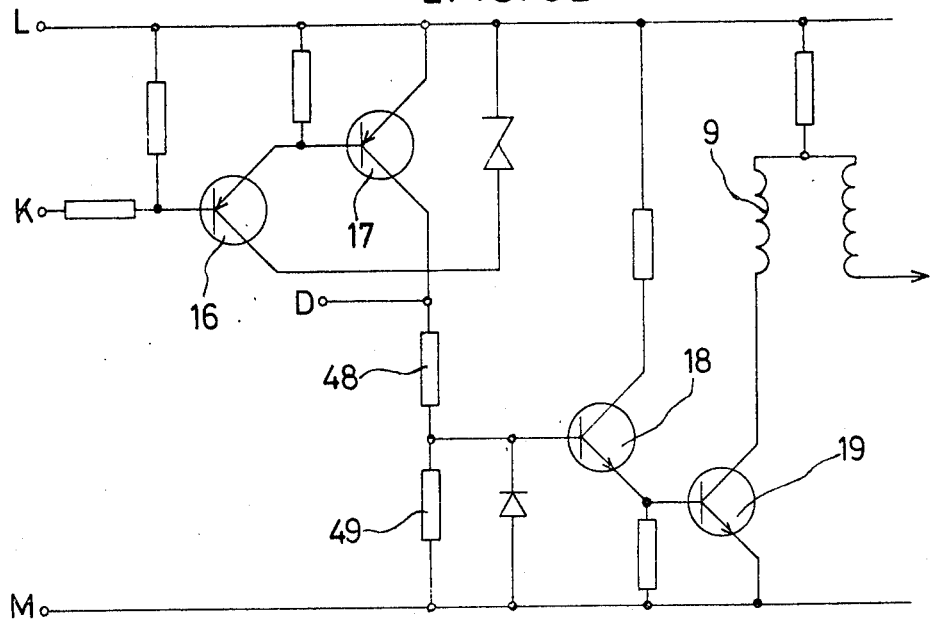
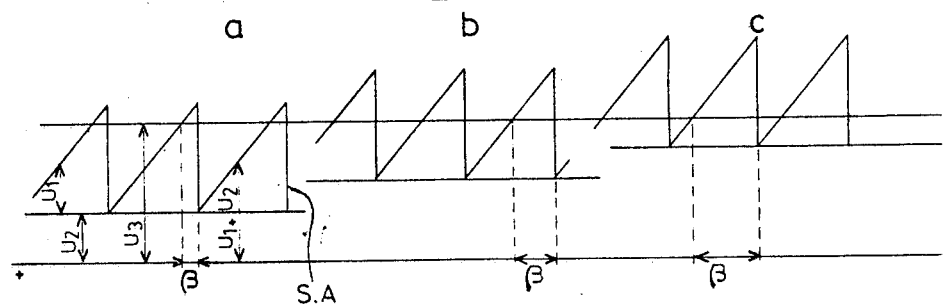

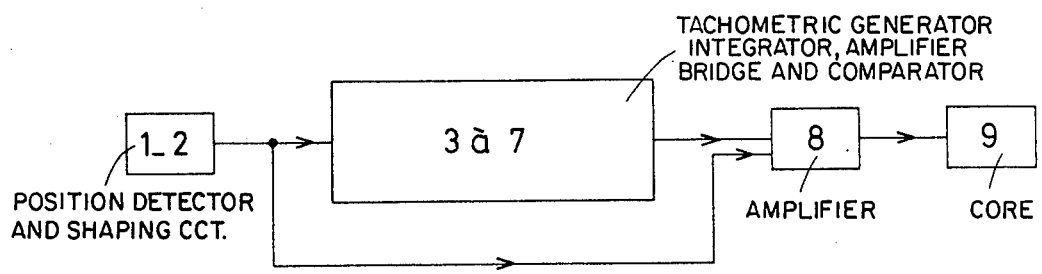
_FIG.8_
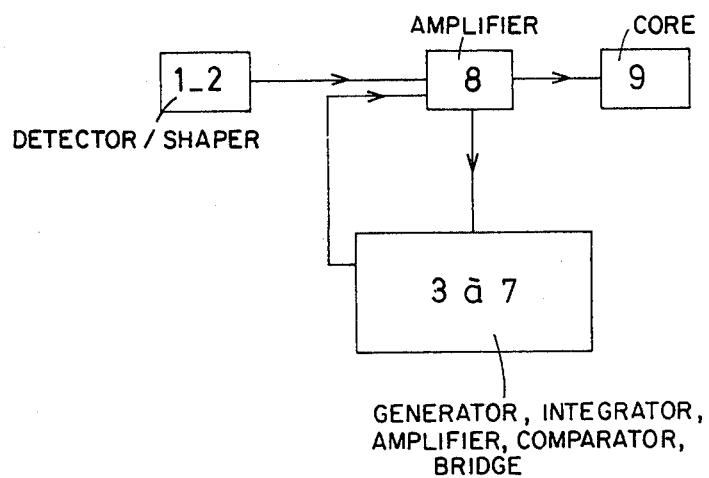
_FIG.9_

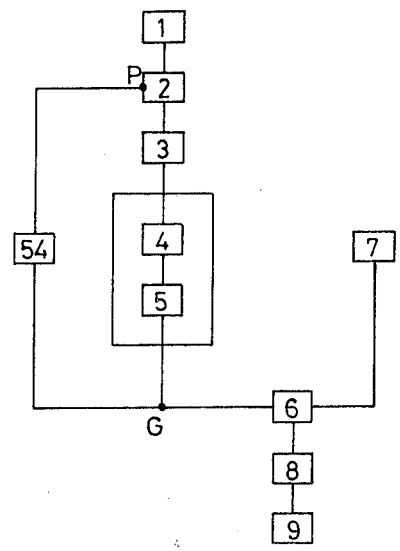
_FIG.10_
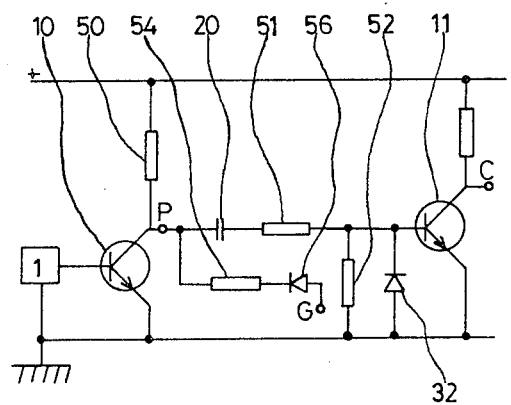
_FIG.11_
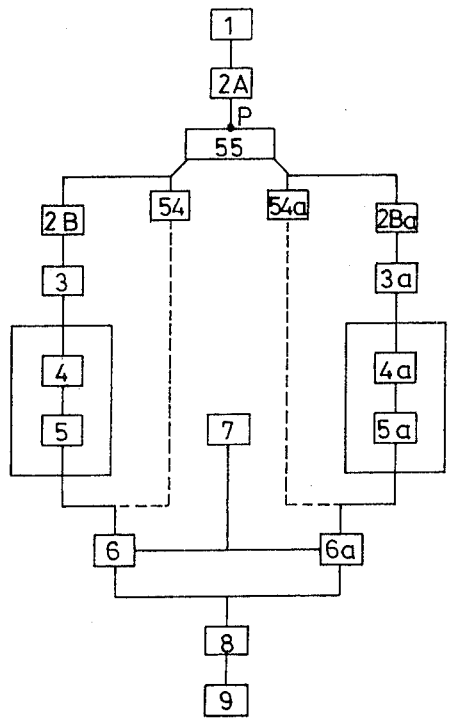
_FIG. 13_
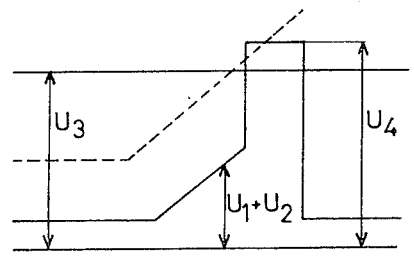
_FIG. 12_

IGNITION SYSTEM FOR INTERNAL COMBUSTION ENGINES

This invention relates to an ignition system and a method of ignition for internal combustion engines, particularly for motor vehicles, notable in that it enables a more or less constant duration of current flow in the voltage step-up ignition coil to be obtained whatever the speed of revolution of the engine.

In known ignition systems for internal combustion engines, the voltage step-up coil is designed to operate at maximum engine speeds; to this end the primary winding of this coil has an inductance value which is limited in such a way that sufficient current flows in the primary to effect ignition during high speed running of the engine; for lower engine speeds, the primary current is greater, which substantially improves the performance of the ignition device; however, this current rapidly reaches a maximum value as the engine speed decreases and this maximum value is a function of the resistance of the primary winding of the coil and of the value of an additional resistance when such a resistance is provided in the device.

Further, when the duration of flow of the primary current exceeds an optimum value, there is no further improvement in the performance, but excessive consumption by the coil serving no useful purpose.

An object of the present invention is to provide an ignition system and method of ignition in which the aforesaid disadvantages are minimised or avoided.

According to the invention, a method of ignition for an internal combustion engine using an ignition system including a voltage step-up coil comprises producing a first voltage U1 of a value proportional to the amount of angular spacing between a reference position and the angularly variable position of an element driven in rotation proportionally to the engine speed, and a second voltage U2 of a value which is a function of the engine speed, in such a way that, when the sum of the voltages U1 + U2 coincides with a threshold voltage U3 of constant and predetermined value, a pulse is triggered which controls the start of charging of the coil so as to obtain a sufficient and controlled duration of current flow in the said coil, whatever the engine speed, in order to limit the current consumption of the said coil at low engine speeds and more particularly when the supply voltage is high.

From another aspect of the invention, an ignition system comprises a tachometric generator which receives through a signal shaping system, signals from a position detector cooperating with an element driven in rotation proportionally to the engine speed, which generator feeds an integrator element which supplies a voltage U1 proportional to the angular spacing between a reference position and the angularly variable position of the element driven in rotation proportionally to the engine speed, an amplifier which, in series with the integrator, supplies a voltage U2 which is a function of the engine speed, and a comparator which receives the sum of the voltages U1 + U2 and compares it with a threshold voltage U3, such that, when U1 + U2 coincides with U3, it supplies an output signal which is used to trigger the establishment of the current in the coil by means of an amplifier stage.

The invention will now be described, by way of example, with reference to the accompanying drawings, in which:

FIG. 1 shows schematically one form of the ignition system of the invention particularly adapted for using the ignition signal as a detection signal, FIG. 2 shows schematically a signal shaping circuit for shaping signals from a detection means of the system of FIG. 1;

FIG. 3 shows schematically a tachometric generator of the system of FIG. 1;

FIG. 4 shows schematically an associated integrator and continuous amplifier of the system of FIG. 1;

FIG. 5 shows schematically a comparator of the system of FIG. 1;

FIG. 6 shows schematically an output amplifier and an amplifier element associated with the coil of the system of FIG. 1;

FIG. 7 shows a diagram of the voltages at the output of the tachometric generator;

FIGS. 8 and 9 show schematically different embodiments of the ignition system of the invention;

FIG. 10 shows schematically another embodiment of the ignition system of the invention particularly adapted for a so-called symmetrical engine;

FIG. 11 shows schematically the signal shaping system for shaping signals from the detection means;

FIG. 12 shows a diagram of the voltages at the comparator for low speeds of revolution of the engine;

FIG. 13 shows schematically an embodiment of the ignition system of the invention particularly adapted for a so-called asymmetrical engine;

Figure 14:
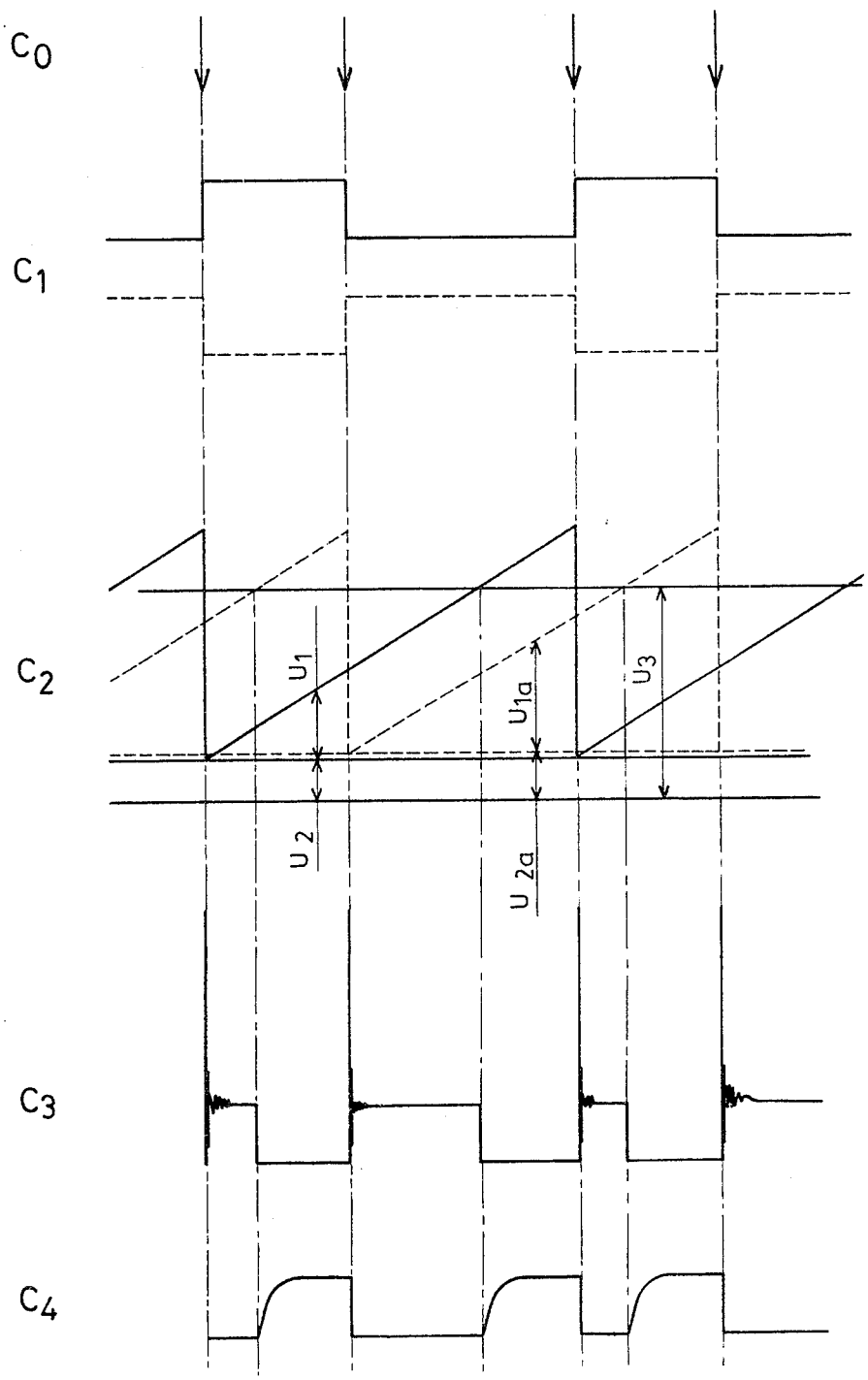
FIG. 14 shows diagrams of the voltages in the ignition system for an asymmetrical engine at a constant speed.

The embodiment of the ignition of the invention shown in FIG. 1 includes a position detector 1 sensitive, for example to the presence of a metallic part. This metallic part is fast with a rotatable element of the ignition distributor in order to detect the ignition signal.

The signals from the position detector 1 are shaped by a device 2, in order to feed a tachometric generator 3, which supplies a current proportional to the engine speed. This current determines two voltages; one through the integrator 4 which supplies a voltage U1 proportional to the angle of rotation of the rotatable element of the distributor and the other through a continuous amplifier 5 which, in series with the integrator 4, supplies a voltage U2 proportional to the engine speed. These two voltages U1 and U2 added together feed a comparator 6 which compares this sum U1 + 0 U2 with a voltage U3, determined by a resistance bridge 7, such that, when U1 + U2 coincides with U3, the comparator sends a signal to an amplifier element 8 which itself establishes the current flow in the ignition coil 9.

The detector 1 and the shaping system 2 are shown in greater detail in FIG. 2.

The detector 1 is a coil excited by a rotatable element of the ignition distributor, (not shown). Only the negative pulses supplied by this coil pass through a diode 30 and are cut off by a diode 31 in order to protect the emitter base junction and to act on the base of a transistor 10, already polarised by means of a resistance 40 connected to an element of the amplifier 8 (see reference D FIGS. 2 and 6). The shaping system is thus constituted essentially by two transistors 10 and 11 and by their load resistances, by a capacitor 20 which selects one front out of two of the signal from the transistor 10 in order to cause the transistor 11 to conduct for a constant period, and by a protection diode 32. The signals obtained at C, on the collector of the transistor 11 are more or less rectangular and of constant duration defined by the condensor 20 and the resistances 50, 51, 52 and these signals feed the tachometric generator 3 (see FIG. 3), which is essentially constituted by a diode 33, a transistor 12, a current limiting resistance 41 and a condensor 21 which calibrates the charge liberated at the occurrence of each signal emitted by the shaping circuit.

The electrical charges from this condensor are filtered by the resistance 42 and the condensor 22. The transistor 13, of which the emitter is connected to the collector of the transistor 12 by the filtering resistance 42, and of which the base, connected to a fixed potential defined by the bridge 43, 44 decoupled by the condensor 23, fixes the potential of the filtering circuit 22, 42 and liberates a current proportional to the engine speed, whatever elements are situated beyond G.

The tachometric generator 3 feeds an integrator 4 and a continuous amplifier 5 disposed in series in the circuit.

The integrator 4 (FIG. 4) comprises a condensor 24 which, charged by the current from the generator 3, supplies a voltage U1 proportional to the angle of rotation of the rotatable element of the distributor independently of the engine speed. The periodic discharge of the condensor is effected by the transistor 14, the emitter-collector junction of which is connected in parallel with the terminals of the condensor 24, by means of a limiting resistance 53 and the base of which is connected at C, that is to say to the collector of the transistor 11, at each ignition pulse, that is to say at each passage of the metallic part of the rotatable element of the ignition distributor in front of the coil 1.

The continuous amplifier (FIG. 4) supplies the voltage U2 as a function of the engine speed from a current supplied by the generator 3 after having passed through the integrator 4. It is constituted by the resistance 45 in series with the condenser 24.

A resistance bridge 7 (FIG. 5) constituted by resistances 46 and 47 supplies a predetermined voltage U3.

The sum of the voltages U1 + U2, automatically obtained at G by virtue of the connection in series of the integrator 4 and the continuous amplifier 5, and the voltage U3, are applied to a comparator 6 (FIG. 5) in which the transistor 15 effects the comparison between U1 + U2 and U3 and, when they coincide, produces a pulse at its collector, which, amplified by the output amplifier 8, permits the current flow in the coil 9.

This output amplifier 8, shown in FIG. 6 is constituted by a Darlington pair including the transistors 16 and 17 and by two transistors 18 and 19 which are arranged with an emitter-follower connection. The emitter-collector junction of the transistor 19 connects the primary of the coil to earth, whilst the base of the transistor 18 is connected between two resistances 48 and 49; the resistance 48 is a limiting resistance and the resistance 49 fixes a potential at the base of the transistor 18.

The resistance 48 connects the collectors of the transistors 16 and 17 to the base of the transistor 18. The voltage obtained at D, FIGS. 2 and 6, i.e. between the Darlington pair and the resistance 48, is applied, by the resistance 40, to the base of the transistor 10 so as to cause the ignition signal in spite of any possible interference.

In the device thus formed, the ignition signal triggers the blocking of the transistor 10 which controls the discharge of the condensor 24 by means of the transistors 11 and 14 which are conducting, and, as a result, the blocking of the transistor 15, which is the comparator and which thus cuts off the amplifier 8 and cuts off the current flow in the coil. A new cycle then simultaneously begins; the condensor 24 charges and when U1 + U2 = U3, the transistor 15 becomes conducting, as do the elements of the amplifier 8, so that current is established in the coil until the next ignition signal.

In the diagram of FIG. 7 the voltages U1, U2, U3, U1 + U2 are shown at different engine speeds i.e. low speed (zone $a$), middle range of speeds (zone $b$), high speed (zone $c$). In this diagram $\beta$ represents the angle of rotation of the rotatable element of the ignition distributor during which the coil 9 charges, i.e. from the moment when U1 + U2 = U3 until the next ignition signal (S.A.). It may be noted that the higher the speed, the greater becomes the angle $\beta$, which implies that the duration of current flow in the coil 9 is more or less constant whatever the engine speed.

The invention thus protects the coil from overheating due to too great a current flow in the said coil at low engine speeds.

FIGS. 8 and 9 show variations of the device of the invention. In the case of FIG. 8, the signal from the shaping device 1-2 feeds the computer 3-7 for the start of charging the coil. The output signal from this computer and the signal from the shaping device are then amplified by the amplifier 8.

The direct connection between the shaping device 2 and the amplifier 8 is used in the event of interference acting in a harmful way on the computer.

In the case of FIG. 9, the signal from the shaping device 1-2 is amplified by the amplifier 8, the amplified signal controlling the computer 3-7 for the start of charging of the coil. The output signal from this computer is in its turn amplified by the same amplifier 8. This device also makes the computer less sensitive to interference.

In these embodiments, the detection signal used is the ignition signal. The correction of the angular spacing of the point of ignition and, as a result, of the start of charging of the coil, is automatically carried out by the so-called ignition advance system.

In the case where the detection signal is independent of the angular spacing of the point of ignition, the continuous amplifying resistance 45 is calculated so as to obtain a maximum output at high engine speeds which also enables the duration of current flow in the coil to be limited at low speeds.

Furthermore, the invention enables the engine to be started with a source of high voltage greater than the voltage of the car battery because of the low consumption at low speeds.

The device shown in FIG. 10 has, as previously described, a signal detector 1, the signals being shaped by a device 2 in order to feed a tachometric generator 3 which supplies a current proportional to the engine speed. This current determines two voltages, one by the integrator 4 which supplies a voltage U1 proportional to the angle of rotation of the rotatable element of the distributor and, another by a continuous amplifier 5 which, in series with the integrator 4 supplies a voltage U2 proportional to the engine speed. These two voltages U1 & U2, added together, feed a comparator 6 which compares this sum U1 + U2 with a voltage U3, determined by a resistance bridge 7 so that, when the sum U1 + U2 coincides with U3, the comparator 6 feeds an amplifier element 8 which itself establishes the current flow in the ignition coil 9. A voltage U4 is produced from a point P of the shaping device 2 and applied to the comparator 6.

In the embodiment shown in FIG. 11, a resistance 54 is connected to the point P of the shaping circuit 2 which is similar to that of FIG. 2, and also to the point G of the comparator 6, which may be similar to FIG. 6 through a separator diode 56 which avoids modifying the value of the voltages U1 + U2 created by the resistance 54 when the value of the voltage U4 is less than the sum U1 + U2.

The voltage obtained at the output of this resistance 54, at G, is the voltage U4 applied to the input G of the comparator 6.

As shown in FIG. 12, at low engine speeds the sum of the voltages U1 and U2 does not reach the value of the voltage U3, but the superposition of U4 on this sum U1 + U3 enables this value of the voltage U3 to be reached and the coil 9 to be charged. Then, the more the engine speed increases, the more the sum U1 + U2 increases, such that U4 no longer plays any part and the start of charging of the coil is effected when U1 + U2 coincides with U3 (see the broken line of FIG. 12).

In the case of a so-called asymmetrical engine, the time separating two ignition sparks is not constant and it is necessary to divide the asymmetrical ignition cycle into several symmetrical ignition cycles. In order to effect this division, a separator element is included at P, which is constituted either by a bistable flip-flop, by a shift register, or by a counter-decoder assembly. The ignition distribution circuit could also be used.

In order to more clearly explain this embodiment, reference will be made to FIG. 13, which show schematically a device adapted for the ignition of an asymmetrical engine, the ignition cycle of which may be split up into two symmetrical cycles.

The device comprises, as described previously, a signal detector 1, an amplifier 8, a coil 9 and a resistance bridge 7 which supplies the voltage U3.

A separator element, shown by the reference numeral 55 of FIG. 13 and which may be constituted by a bistable flip-flop, is located at P within the shaping system 2, which system is then composed of a portion 2A, mainly constituted by the transistor 10 and its charging resistance 50 (see FIG. 11), and of two portions 2B and 2Ba, each constituted by a condensor 20, a transistor 11 and a charging resistance (see FIG. 11).

To each of the two outputs of the bistable flip-flop 55 is connected a shunt circuit comprising an element 2B or 2Ba described above, a tachometric generator 3 or 3a, an integrator 4 or 4a, or a continuous amplifier 5 or 5a and a comparator 6 or 6a, these elements being identical to those described above. A resistance 54 or 54a may be connected in each shunt circuit, as in the embodiment shown in FIGS. 10 and 11, when this is necessary for low engine speeds.

The diagrams shown in FIG. 14 will make it easier to understand the operation of such a device.

The diagram $C_0$ shows the control signals from the detector 1, the diagram $C_1$ shows the additional signals supplied by the bistable flip-flop. The diagram $C_2$ shows the various sums U1 + U2 and U1a + U2a, each corresponding to one of the shunt circuits, the diagram $C_3$ shows the curve of the voltage at the primary of the ignition coil and the diagram $C_4$ the curve of the current flowing in the primary of the ignition coil.

Each time (U1 + U2) and U3 or (U1a + U2a) and U3 become equal, control of the start of charging of the coil is effected; the angle of displacement between the two shunt circuits is obtained by means of the characteristics of the bistable flip-flop.

It is clear that the voltages U2 and U2a, which are a function of the speed of revolution of the engine, may not be sensitive to the asymmetry of the engine, which is a problem of angular position. They can then be translated by one only of the two values U2 or U2a, necessitating only one generating device for this voltage U2 or U2a.

It is clear that many modifications may be made to embodiments described above, without, however, exceeding the scope of the invention. In particular, when the non-symmetry of the engine makes it necessary to split the ignition cycle into more than two elementary ignition cycles, it is necessary to use a separator element having more than two outputs, which results in the use of shift registers, or of a counter-decoder assembly, or the distribution circuit of the ignition device.

In order to use the device shown in FIG. 10 in an asymmetrical engine, the information supplied by the outputs, either of the bistable flip-flop, or of the shift register, or of the counter-decoder assembly, is insufficient since it does not show the signals supplied by the angular position detector, but rather the time separating two successive ignition sparks (see diagram $C_1$ of FIG. 14). It is then necessary to complete the separator element 55 by a suitable logic circuit, in order that the signals from this separator element should be capable of being used by the resistances 54 and 54a. This logic circuit combines the signals obtained at the point P with the signals obtained at the output either of the bistable flip-flop, or of the shift register, or of the counter-decoder assembly. At the point P an angular position signal A is obtained corresponding to the voltage U4. This signal A is used, for example, by the bistable flip-flop of the separator element 55, supplying additional signals B1 and B2 which are the signals of the diagram C1 of FIG. 14. This additional combining logic circuit may be constituted by OR gates. One of these gates receives the signal A and the signal B1 and supplies a signal D1. The other OR gate receives the signal A and the signal B2 and supplies a signal D2. The signals D1 and D2 may each be used by an element 54 for superposing U4 on U1 + U2 and to cause the charging of the coil as shown in FIG. 12.

I claim:

1. An ignition dwell control system for an internal combustion engine comprising in combination,
   an engine driven rotary position detector,
   a signal shaping circuit connected to said detector and adapted to emit pulses at a frequency proportional to the rotary speed of said detector,
   a tachometric generator connected to said signal shaping circuit and incorporating a current source adapted to draw current at a rate proportional to the frequency of the pulses emitted from said signal shaping circuit,
   a resistor and an integrating capacitor connected in series with said current source,
   means actuated in response to the pulses emitted from said signal shaping circuit for periodically resetting said capacitor when said position detector is at a reference position so that the voltage U1 across the capacitor is proportional to the angular displacement of the detector from the reference position, and the voltage U2 across the resistor is proportional to the rotary speed of the detector, a source of threshold voltage U3, a comparator connected to said resistor and integrating capacitor and to said source of threshold voltage, adapted to compare the sum of the position and speed voltages U1 and U2 with the threshold voltage U3 and to produce an output signal when the voltage sum exceeds the threshold voltage, an ignition coil connected to said comparator, and an amplifier interposed between the comparator and the ignition coil and being adapted to allow current to flow through the ignition coil when the comparator produces an output, said coil being adapted to produce an ignition spark output when the comparator ceases to produce an output.

2. An ignition system according to claim 1 wherein said position detector is the ignition signal generator.

3. An ignition system according to claim 1, comprising a diode connected to the input of the comparator and a resistance is connected to said signal shaping circuit and to said diode to supply a voltage U4 to the comparator such that at low engine speeds the start of charging of the coil is effected when U4 = U3, and that at higher engine speeds the start of charging is effected when the sum U1 + U2 coincides with U3.

4. An ignition system according to claim 1 adapted for use on an asymmetrical engine, comprising a separator element for shaping the signals from the detector and adapted to split the asymmetrical ignition cycle of the engine into at least two symmetrical ignition cycles, said separator being adapted to have as many outputs as there are symmetrical cycles resulting from the splitting of the asymmetrical cycle, each output controlling its respective assembly of circuits through its respective portion of the shaping system, each assembly of circuits comprising a separate tachometric generator, a separate integrator fed by the tachometric generator and supplying the voltage U1, a separate amplifier mounted in series with the integrator and supplying the voltage U2, and a separate comparator which receives the sum of the voltages U1 + U2 and compares it with the voltage U3, the outputs of all the comparators being connected to the ignition coil through said amplifier.

5. A system according to claim 4, wherein said separator element consists of a bistable flip-flop.

6. A system according to claim 4, wherein said separator element consists of a shift register.

7. A system according to claim 4, wherein said separator element consists of a counter-decoder assembly.

8. A system according to claim 4, wherein said separator element consists of the actual ignition distribution circuits.

9. A system according to claim 4, wherein said separator element includes a combining logic circuit which uses the signals emitted by the position detector and treated by the shaping circuit, and the signals emitted by said separator.

* * * * *

UNITED STATES PATENT OFFICE
CERTIFICATE OF CORRECTION

Patent No. 4,086,895     Dated May 2, 1978

Inventor(s) Roger Habert

It is certified that error appears in the above-identified patent and that said Letters Patent are hereby corrected as shown below:

On the title page the following should be added:

-- [73] Assignee:   Ducellier Et Cie, Paris, France --.

Signed and Sealed this

Tenth Day of October 1978

[SEAL]

Attest:

RUTH C. MASON
Attesting Officer

DONALD W. BANNER
Commissioner of Patents and Trademarks